(12) United States Patent
Grilli et al.

(10) Patent No.: US 8,098,818 B2
(45) Date of Patent: Jan. 17, 2012

(54) SECURE REGISTRATION FOR A MULTICAST-BROADCAST-MULTIMEDIA SYSTEM (MBMS)

(75) Inventors: Francesco Grilli, San Diego, CA (US); Lorenzo Casaccia, San Diego, CA (US); James Semple, London (GB); Parag A. Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1278 days.

(21) Appl. No.: 10/617,215

(22) Filed: Jul. 7, 2003

(65) Prior Publication Data

US 2005/0008159 A1 Jan. 13, 2005

(51) Int. Cl.
*H04L 9/00* (2006.01)
(52) U.S. Cl. .......................... 380/44; 380/270
(58) Field of Classification Search .............. 380/42, 380/44–46, 247–249, 270–273; 713/181, 713/175; 370/312, 432, 328; 455/522, 455
See application file for complete search history.

(56) References Cited

U.S. PATENT DOCUMENTS

| | | |
|---|---|---|
| 4,163,255 A | 7/1979 | Pires et al. |
| 4,323,921 A | 4/1982 | Guillou et al. |
| 4,750,167 A | 6/1988 | Meyer et al. |
| 4,870,408 A | 9/1989 | Zdunek et al. |
| 4,881,263 A | 11/1989 | Herbison et al. |
| 4,901,307 A | 2/1990 | Gilhousen et al. |
| RE33,189 E | 3/1990 | Lee et al. |
| 4,924,513 A | 5/1990 | Herbison et al. |
| 5,056,109 A | 10/1991 | Gilhousen et al. |
| 5,101,501 A | 3/1992 | Gilhousen et al. |
| 5,103,459 A | 4/1992 | Gilhousen et al. |
| 5,117,457 A | 5/1992 | Comerford et al. |
| 5,136,586 A | 8/1992 | Greenblatt et al. |
| 5,150,412 A | 9/1992 | Maru et al. |
| 5,159,447 A | 10/1992 | Haskell et al. |
| 5,164,988 A | 11/1992 | Matyas et al. |

(Continued)

FOREIGN PATENT DOCUMENTS

CN 1281561 A 1/2001

(Continued)

OTHER PUBLICATIONS

Al-Tawil et al. "A New Authentication Protocol for Roaming Users in GSM Networks," *Proc. IEEE Int'l Symposium on Computers and Communications*, Jul. 6, 1999; pp. 93-99; XP002168055.

(Continued)

*Primary Examiner* — Beemnet W Dada
(74) *Attorney, Agent, or Firm* — Kristine U Ekwueme

(57) ABSTRACT

A method and an apparatus for secure registration for a multicast-broadcast-multimedia system (MBMS) are disclosed. A random number is generated by a broadcast-multicast-service center (BM-SC) and broadcast to user equipment in the coverage area of a radio access network (RAN). A memory module or smart card (UICC) in the user equipment generates a radio access network key (RAK) which is a function of the random number and a key selected from the group consisting of a public land mobile network key (PK) and a broadcast access key (BAK), and then generates a temporary registration key (RGK) as a function of the RAK, a service identification number and a user identification number, for example, P-TMSI, which may be extracted by the RAN to authenticate the registration as legitimate.

52 Claims, 3 Drawing Sheets

U.S. PATENT DOCUMENTS

| | | |
|---|---|---|
| 5,235,631 A | 8/1993 | Grube et al. |
| 5,237,612 A | 8/1993 | Raith |
| 5,241,598 A | 8/1993 | Raith |
| 5,253,294 A | 10/1993 | Maurer et al. |
| 5,257,396 A | 10/1993 | Auld, Jr. et al. |
| 5,325,357 A | 6/1994 | Kimoto et al. |
| 5,351,087 A | 9/1994 | Christopher et al. |
| 5,353,332 A | 10/1994 | Raith et al. |
| 5,363,379 A | 11/1994 | Eckenrode et al. |
| 5,365,572 A | 11/1994 | Saegusa et al. |
| 5,369,784 A | 11/1994 | Nelson et al. |
| 5,371,794 A * | 12/1994 | Diffie et al. .................. 713/156 |
| 5,404,563 A | 4/1995 | Green et al. |
| 5,410,602 A | 4/1995 | Finkelstein et al. |
| 5,412,655 A | 5/1995 | Yamada et al. |
| 5,421,006 A | 5/1995 | Jablon et al. |
| 5,448,568 A | 9/1995 | Delpuch et al. |
| 5,467,398 A | 11/1995 | Pierce et al. |
| 5,473,609 A | 12/1995 | Chaney et al. |
| 5,473,642 A | 12/1995 | Osawa et al. |
| 5,481,613 A | 1/1996 | Ford et al. |
| 5,485,577 A | 1/1996 | Eyer et al. |
| 5,504,773 A | 4/1996 | Padovani et al. |
| 5,513,245 A | 4/1996 | Mizikovsky et al. |
| 5,515,441 A | 5/1996 | Faucher et al. |
| 5,537,474 A | 7/1996 | Brown et al. |
| 5,565,909 A | 10/1996 | Thibadeau et al. |
| 5,592,470 A | 1/1997 | Rudrapatna et al. |
| 5,673,259 A | 9/1997 | Quick, Jr. et al. |
| 5,686,963 A | 11/1997 | Uz et al. |
| 5,708,961 A | 1/1998 | Hylton et al. |
| 5,729,540 A | 3/1998 | Wegrzyn et al. |
| 5,740,246 A | 4/1998 | Saito |
| 5,748,736 A | 5/1998 | Mittra |
| 5,751,707 A | 5/1998 | Voit et al. |
| 5,751,725 A | 5/1998 | Chen et al. |
| 5,758,068 A | 5/1998 | Brandt et al. |
| 5,758,291 A | 5/1998 | Grube et al. |
| 5,768,276 A | 6/1998 | Diachina et al. |
| 5,774,496 A | 6/1998 | Butler et al. |
| 5,778,059 A | 7/1998 | Loghmani et al. |
| 5,778,069 A | 7/1998 | Thomlinson et al. |
| 5,778,187 A | 7/1998 | Monteiro et al. |
| 5,787,347 A | 7/1998 | Yu et al. |
| 5,796,829 A | 8/1998 | Newby et al. |
| 5,835,730 A | 11/1998 | Grossman et al. |
| 5,850,444 A | 12/1998 | Rune et al. |
| 5,850,445 A | 12/1998 | Chan et al. |
| 5,870,474 A | 2/1999 | Wasilewski et al. |
| 5,878,141 A | 3/1999 | Daly et al. |
| 5,881,368 A | 3/1999 | Grob et al. |
| 5,884,196 A | 3/1999 | Lekven et al. |
| 5,887,252 A | 3/1999 | Noneman et al. |
| 5,909,491 A | 6/1999 | Luo et al. |
| 5,923,649 A | 7/1999 | Raith et al. |
| 5,936,965 A | 8/1999 | Doshi et al. |
| 5,940,507 A | 8/1999 | Cane et al. |
| 5,946,316 A | 8/1999 | Chen et al. |
| 5,956,404 A | 9/1999 | Schneier et al. |
| 5,956,681 A | 9/1999 | Yamakita et al. |
| 5,970,072 A | 10/1999 | Gammenthaler, Jr. et al. |
| 5,970,417 A | 10/1999 | Toyryla et al. |
| 5,978,386 A | 11/1999 | Hamalainen et al. |
| 5,983,099 A | 11/1999 | Yao et al. |
| 5,990,928 A | 11/1999 | Sklar et al. |
| 5,991,400 A | 11/1999 | Kamperman et al. |
| 5,991,407 A | 11/1999 | Murto et al. |
| 6,006,073 A | 12/1999 | Glauner et al. |
| 6,018,360 A | 1/2000 | Stewart et al. |
| 6,021,124 A | 2/2000 | Haartsen et al. |
| 6,026,165 A | 2/2000 | Marino et al. |
| 6,032,197 A | 2/2000 | Birdwell et al. |
| 6,044,154 A | 3/2000 | Kelly et al. |
| 6,047,071 A | 4/2000 | Shah et al. |
| 6,047,395 A | 4/2000 | Zook et al. |
| 6,052,812 A | 4/2000 | Chen et al. |
| 6,055,236 A | 4/2000 | Nessett et al. |
| 6,055,314 A | 4/2000 | Spies et al. |
| 6,058,289 A | 5/2000 | Gardner et al. |
| 6,065,061 A | 5/2000 | Blahut et al. |
| 6,067,290 A | 5/2000 | Paulraj et al. |
| 6,073,122 A | 6/2000 | Wool et al. |
| 6,081,907 A | 6/2000 | Witty et al. |
| 6,097,817 A | 8/2000 | Bilgic et al. |
| 6,098,878 A | 8/2000 | Dent et al. |
| 6,108,424 A | 8/2000 | Pitiot et al. |
| 6,108,706 A | 8/2000 | Birdwell et al. |
| 6,111,866 A | 8/2000 | Kweon et al. |
| 6,128,389 A | 10/2000 | Chan et al. |
| 6,128,490 A | 10/2000 | Shaheen et al. |
| 6,148,010 A | 11/2000 | Sutton et al. |
| 6,157,719 A | 12/2000 | Wasilewski et al. |
| 6,172,972 B1 | 1/2001 | Birdwell et al. |
| 6,185,430 B1 | 2/2001 | Yee et al. |
| 6,195,546 B1 | 2/2001 | Leung et al. |
| 6,199,161 B1 | 3/2001 | Ahvenainen et al. |
| 6,201,961 B1 | 3/2001 | Schindall et al. |
| 6,208,634 B1 | 3/2001 | Boulos et al. |
| 6,230,024 B1 | 5/2001 | Wang et al. |
| 6,233,234 B1 | 5/2001 | Curry et al. |
| 6,233,341 B1 | 5/2001 | Riggins et al. |
| 6,240,091 B1 | 5/2001 | Ginzboorg et al. |
| 6,253,069 B1 | 6/2001 | Mankovitz et al. |
| 6,253,326 B1 | 6/2001 | Lincke et al. |
| 6,256,509 B1 | 7/2001 | Tanaka et al. |
| 6,266,420 B1 | 7/2001 | Langford et al. |
| 6,272,632 B1 | 8/2001 | Carman et al. |
| 6,295,361 B1 | 9/2001 | Kadansky et al. |
| 6,310,661 B1 | 10/2001 | Arsenault et al. |
| 6,314,095 B1 | 11/2001 | Loa et al. |
| 6,343,280 B2 | 1/2002 | Clark et al. |
| 6,345,307 B1 | 2/2002 | Booth et al. |
| 6,353,614 B1 | 3/2002 | Borella et al. |
| 6,363,242 B1 | 3/2002 | Brown, Jr. et al. |
| 6,363,480 B1 | 3/2002 | Perlman et al. |
| 6,373,829 B1 | 4/2002 | Vilmur et al. |
| 6,374,103 B1 | 4/2002 | Kamel et al. |
| 6,377,810 B1 | 4/2002 | Geiger et al. |
| 6,385,200 B1 | 5/2002 | Erami et al. |
| 6,385,461 B1 | 5/2002 | Raith et al. |
| 6,415,312 B1 | 7/2002 | Boivie |
| 6,424,717 B1 | 7/2002 | Pinder et al. |
| 6,424,947 B1 | 7/2002 | Tsuria et al. |
| 6,434,367 B1 | 8/2002 | Kumar et al. |
| 6,438,612 B1 | 8/2002 | Ylonen et al. |
| 6,449,491 B1 | 9/2002 | Dailey et al. |
| 6,463,155 B1 | 10/2002 | Akiyama et al. |
| 6,473,419 B1 | 10/2002 | Gray et al. |
| 6,473,858 B1 | 10/2002 | Shimomura et al. |
| 6,477,377 B2 | 11/2002 | Backstrom et al. |
| 6,490,259 B1 | 12/2002 | Agrawal et al. |
| 6,502,140 B1 | 12/2002 | Boivie |
| 6,507,590 B1 | 1/2003 | Terho et al. |
| 6,510,515 B1 | 1/2003 | Raith et al. |
| RE38,007 E | 2/2003 | Tsukamoto et al. |
| 6,519,266 B1 | 2/2003 | Manning et al. |
| 6,523,069 B1 | 2/2003 | Luczycki et al. |
| 6,529,740 B1 | 3/2003 | Ganucheau, Jr. et al. |
| 6,536,041 B1 | 3/2003 | Knudson et al. |
| 6,538,996 B1 | 3/2003 | West et al. |
| 6,539,242 B1 | 3/2003 | Bayley |
| 6,542,490 B1 | 4/2003 | Ahmadvand et al. |
| 6,549,771 B2 | 4/2003 | Chang et al. |
| 6,560,206 B1 | 5/2003 | Naden et al. |
| 6,564,211 B1 | 5/2003 | Andreev et al. |
| 6,567,914 B1 | 5/2003 | Just et al. |
| 6,571,109 B1 | 5/2003 | Kim et al. |
| 6,574,211 B2 | 6/2003 | Padovani et al. |
| 6,577,734 B1 | 6/2003 | Etzel et al. |
| 6,577,848 B1 | 6/2003 | Gregg et al. |
| 6,580,756 B1 | 6/2003 | Matsui et al. |
| 6,598,203 B1 | 7/2003 | Tang et al. |
| 6,600,745 B1 | 7/2003 | Chopping et al. |
| 6,601,068 B1 | 7/2003 | Park et al. |
| 6,603,857 B1 | 8/2003 | Batten-Carew et al. |
| 6,606,706 B1 | 8/2003 | Li et al. |
| 6,608,841 B1 | 8/2003 | Koodli et al. |

| | | | | | | |
|---|---|---|---|---|---|---|
| 6,614,804 B1 | 9/2003 | McFadden et al. | 7,237,108 B2 | 6/2007 | Medvinsky et al. | |
| 6,633,979 B1 | 10/2003 | Smeets et al. | 7,239,704 B1 | 7/2007 | Maillard et al. | |
| 6,647,000 B1 | 11/2003 | Persson et al. | 7,266,687 B2 | 9/2007 | Sowa et al. | |
| 6,654,384 B1 | 11/2003 | Reza et al. | 7,278,164 B2 | 10/2007 | Raiz et al. | |
| 6,658,463 B1 | 12/2003 | Dillon et al. | 7,280,660 B2 | 10/2007 | Salo et al. | |
| 6,665,718 B1 | 12/2003 | Chuah et al. | 7,290,063 B2 | 10/2007 | Kalliokulju et al. | |
| 6,680,920 B1 | 1/2004 | Wan et al. | 7,301,968 B2 | 11/2007 | Haran et al. | |
| 6,690,795 B1 | 2/2004 | Richards et al. | 7,352,868 B2 | 4/2008 | Hawkes et al. | |
| 6,704,368 B1 | 3/2004 | Nefedov et al. | 7,376,963 B2 | 5/2008 | Kato et al. | |
| 6,704,369 B1 | 3/2004 | Kawasaki et al. | 2001/0004761 A1 | 6/2001 | Zehavi et al. | |
| 6,711,182 B1 | 3/2004 | Gibbs et al. | 2001/0029581 A1 | 10/2001 | Knauft et al. | |
| 6,714,650 B1 | 3/2004 | Maillard et al. | 2001/0036200 A1 | 11/2001 | Nelson et al. | |
| 6,714,784 B1 | 3/2004 | Forssell et al. | 2001/0036834 A1 | 11/2001 | Das et al. | |
| 6,721,805 B1 | 4/2004 | Bhagwat et al. | 2001/0055298 A1 | 12/2001 | Baker et al. | |
| 6,725,459 B2 | 4/2004 | Bacon et al. | 2002/0001386 A1 | 1/2002 | Akiyama et al. | |
| 6,728,226 B1 | 4/2004 | Naito | 2002/0002541 A1 | 1/2002 | Williams et al. | |
| 6,731,936 B2 | 5/2004 | Butler et al. | 2002/0010681 A1 | 1/2002 | Hillegass et al. | |
| 6,735,177 B1 | 5/2004 | Suzuki et al. | 2002/0014159 A1 | 2/2002 | Tatsumi et al. | |
| 6,751,218 B1 | 6/2004 | Hagirahim et al. | 2002/0021809 A1 | 2/2002 | Salo et al. | |
| 6,760,602 B2 | 7/2004 | Tangorra et al. | 2002/0023165 A1 | 2/2002 | Lahr et al. | |
| 6,760,752 B1 | 7/2004 | Liu et al. | 2002/0071558 A1 | 6/2002 | Patel | |
| 6,763,025 B2 | 7/2004 | Leatherbury et al. | 2002/0076195 A1 | 6/2002 | Nakajima et al. | |
| 6,765,909 B1 | 7/2004 | Sen et al. | 2002/0080887 A1 | 6/2002 | Jeong et al. | |
| 6,766,024 B1 | 7/2004 | Rix et al. | 2002/0091860 A1 | 7/2002 | Kalliokulju et al. | |
| 6,775,303 B1 | 8/2004 | Rustad et al. | 2002/0091931 A1 | 7/2002 | Quick, Jr. et al. | |
| 6,781,999 B2 | 8/2004 | Eyuboglu et al. | 2002/0097722 A1 | 7/2002 | Liao et al. | |
| 6,788,681 B1 | 9/2004 | Hurren et al. | 2002/0099949 A1 | 7/2002 | Fries et al. | |
| 6,792,048 B1 | 9/2004 | Lee et al. | 2002/0102964 A1 | 8/2002 | Park | |
| 6,798,791 B1 | 9/2004 | Riazi et al. | 2002/0112234 A1 | 8/2002 | Bacon et al. | |
| 6,801,508 B1 | 10/2004 | Lim et al. | 2002/0141591 A1 | 10/2002 | Hawkes et al. | |
| 6,804,520 B1 | 10/2004 | Johansson et al. | 2002/0152384 A1 | 10/2002 | Shelest et al. | |
| 6,819,930 B1 | 11/2004 | Laroia et al. | 2002/0154781 A1 | 10/2002 | Sowa et al. | |
| 6,826,406 B1 | 11/2004 | Vialen et al. | 2002/0164025 A1 | 11/2002 | Raiz et al. | |
| 6,831,910 B1 | 12/2004 | Moon et al. | 2002/0169724 A1 | 11/2002 | Moroney et al. | |
| 6,832,314 B1 | 12/2004 | Irvin et al. | 2002/0176408 A1 | 11/2002 | Kangas et al. | |
| 6,862,684 B1 | 3/2005 | DiGiorgio | 2002/0181423 A1 | 12/2002 | Chen et al. | |
| 6,870,923 B2 | 3/2005 | Yi et al. | 2003/0009669 A1 | 1/2003 | White et al. | |
| 6,879,573 B1 | 4/2005 | Huo et al. | 2003/0018891 A1 | 1/2003 | Hall et al. | |
| 6,879,690 B2 * | 4/2005 | Faccin et al. ............... 380/247 | 2003/0030581 A1 | 2/2003 | Roy | |
| 6,882,850 B2 | 4/2005 | McConnell et al. | 2003/0031322 A1 | 2/2003 | Beckmann et al. | |
| 6,882,860 B1 | 4/2005 | Kim et al. | 2003/0035389 A1 | 2/2003 | Chen et al. | |
| 6,885,874 B2 | 4/2005 | Grube et al. | 2003/0039237 A1 | 2/2003 | Forslow et al. | |
| 6,895,216 B2 | 5/2005 | Sato et al. | 2003/0039361 A1 | 2/2003 | Hawkes et al. | |
| 6,898,285 B1 | 5/2005 | Hutchings et al. | 2003/0054807 A1 | 3/2003 | Hsu et al. | |
| 6,898,640 B1 | 5/2005 | Kurita et al. | 2003/0064679 A1 | 4/2003 | Kim et al. | |
| 6,915,272 B1 | 7/2005 | Zilliacus et al. | 2003/0070092 A1 | 4/2003 | Hawkes et al. | |
| 6,918,035 B1 * | 7/2005 | Patel ............................ 713/169 | 2003/0072384 A1 | 4/2003 | Chen et al. | |
| 6,920,119 B2 | 7/2005 | Rinchiuso | 2003/0087653 A1 | 5/2003 | Leung et al. | |
| 6,925,285 B2 | 8/2005 | Kim et al. | 2003/0101401 A1 | 5/2003 | Salvi et al. | |
| 6,944,763 B1 | 9/2005 | Asano et al. | 2003/0123669 A1 | 7/2003 | Koukoulidis et al. | |
| 6,956,833 B1 | 10/2005 | Yukie et al. | 2003/0126440 A1 | 7/2003 | Go et al. | |
| 6,959,384 B1 | 10/2005 | Serret-Avila | 2003/0134655 A1 | 7/2003 | Chen et al. | |
| 6,970,689 B2 | 11/2005 | Khorram | 2003/0135748 A1 | 7/2003 | Yamada et al. | |
| 6,978,143 B1 | 12/2005 | Vialen | 2003/0159029 A1 | 8/2003 | Brown et al. | |
| 6,983,410 B2 | 1/2006 | Chen et al. | 2003/0217057 A1 | 11/2003 | Kuroiwa et al. | |
| 6,987,982 B2 | 1/2006 | Willenegger et al. | 2004/0005860 A1 | 1/2004 | Kato et al. | |
| 6,990,680 B1 | 1/2006 | Wugofski et al. | 2004/0019787 A1 * | 1/2004 | Shibata ........................ 713/168 |
| 7,016,351 B1 | 3/2006 | Farinacci et al. | 2004/0022216 A1 * | 2/2004 | Shi ............................... 370/335 |
| 7,036,023 B2 | 4/2006 | Fries et al. | 2004/0095515 A1 | 5/2004 | Tajima et al. | |
| 7,039,180 B1 | 5/2006 | Issaa et al. | 2004/0101138 A1 | 5/2004 | Revital et al. | |
| 7,046,672 B2 | 5/2006 | Liao et al. | 2004/0107350 A1 | 6/2004 | Wasilewski et al. | |
| 7,058,809 B2 | 6/2006 | White et al. | 2004/0120527 A1 | 6/2004 | Hawkes et al. | |
| 7,069,436 B1 | 6/2006 | Akachi | 2004/0131185 A1 * | 7/2004 | Kakumer ...................... 380/247 |
| 7,072,865 B2 | 7/2006 | Akiyama et al. | 2004/0132402 A1 | 7/2004 | Agashe et al. | |
| 7,079,502 B2 | 7/2006 | Yamano et al. | 2004/0151317 A1 | 8/2004 | Hyyppa et al. | |
| 7,079,523 B2 | 7/2006 | Nelson, Jr. et al. | 2004/0199474 A1 | 10/2004 | Ritter | |
| 7,096,355 B1 | 8/2006 | Marvit et al. | 2004/0202329 A1 | 10/2004 | Jung et al. | |
| 7,114,175 B2 * | 9/2006 | Lahteenmaki ................. 726/4 | 2004/0243808 A1 | 12/2004 | Ishiguro et al. | |
| 7,116,892 B2 | 10/2006 | Wajs | 2004/0266391 A1 | 12/2004 | Hafren et al. | |
| 7,133,353 B2 | 11/2006 | Sourour et al. | 2005/0008159 A1 | 1/2005 | Grilli et al. | |
| 7,134,019 B2 | 11/2006 | Shelest et al. | 2005/0048963 A1 | 3/2005 | Kubler et al. | |
| 7,177,424 B1 | 2/2007 | Furuya et al. | 2005/0055551 A1 | 3/2005 | Becker et al. | |
| 7,181,620 B1 | 2/2007 | Hur | 2005/0063544 A1 | 3/2005 | Uusitalo et al. | |
| 7,185,362 B2 | 2/2007 | Hawkes et al. | 2005/0108563 A1 | 5/2005 | Becker et al. | |
| 7,197,072 B1 | 3/2007 | Hsu et al. | 2005/0144550 A1 | 6/2005 | Jeon et al. | |
| 7,200,230 B2 | 4/2007 | Knauft et al. | 2005/0165711 A1 | 7/2005 | Hamatsu | |
| 7,203,314 B1 | 4/2007 | Kahn et al. | 2005/0216731 A1 | 9/2005 | Saito et al. | |
| 7,209,459 B2 | 4/2007 | Kangas et al. | 2005/0238315 A1 | 10/2005 | Kataoka | |
| 7,215,775 B2 * | 5/2007 | Noguchi et al. ............. 380/249 | 2005/0271210 A1 | 12/2005 | Soppera et al. | |

| | | | |
|---|---|---|---|
| 2006/0078000 A1 | 4/2006 | Rinne et al. | |
| 2006/0168446 A1 | 7/2006 | Ahonen et al. | |
| 2006/0171540 A1 | 8/2006 | Lee et al. | |
| 2006/0242412 A1 | 10/2006 | Jung et al. | |
| 2007/0038610 A1 | 2/2007 | Omoigui et al. | |
| 2007/0116282 A1 | 5/2007 | Hawkes et al. | |
| 2007/0214482 A1 | 9/2007 | Nguyen et al. | |
| 2007/0280169 A1 | 12/2007 | Cam Winget | |

FOREIGN PATENT DOCUMENTS

| | | |
|---|---|---|
| EP | 0636963 A2 | 2/1995 |
| EP | 0702477 A2 | 3/1996 |
| EP | 0748058 A2 | 12/1996 |
| EP | 0813309 A2 | 12/1997 |
| EP | 0854618 A2 | 7/1998 |
| EP | 0924898 A1 | 6/1999 |
| EP | 0928084 A2 | 7/1999 |
| EP | 0951198 A2 | 10/1999 |
| EP | 0993128 A1 | 4/2000 |
| EP | 0999656 A1 | 5/2000 |
| EP | 1001570 | 5/2000 |
| EP | 1024661 A2 | 8/2000 |
| EP | 1030484 A2 | 8/2000 |
| EP | 1032150 A2 | 8/2000 |
| EP | 1071296 A1 | 1/2001 |
| EP | 1075118 A2 | 2/2001 |
| EP | 1075123 A1 | 2/2001 |
| EP | 1098446 A2 | 5/2001 |
| EP | 1117204 A2 | 7/2001 |
| EP | 1134951 A2 | 9/2001 |
| EP | 1143635 A1 | 10/2001 |
| EP | 1185125 A1 | 3/2002 |
| EP | 1190526 A1 | 3/2002 |
| EP | 1213943 A1 | 6/2002 |
| EP | 1248188 A1 | 10/2002 |
| EP | 1374477 A1 | 1/2004 |
| EP | 2204940 | 7/2010 |
| GB | 2346512 A | 8/2000 |
| JP | 1101042 A | 4/1989 |
| JP | 02090840 | 3/1990 |
| JP | 03179841 | 5/1991 |
| JP | 5216411 A | 8/1993 |
| JP | 06125554 | 5/1994 |
| JP | 7115414 | 5/1995 |
| JP | 7193569 A | 7/1995 |
| JP | 7288798 | 10/1995 |
| JP | 9135478 A | 5/1997 |
| JP | 10023529 A | 1/1998 |
| JP | 10051380 A | 2/1998 |
| JP | 10063598 A | 3/1998 |
| JP | 10093547 | 4/1998 |
| JP | 10093547 A | 4/1998 |
| JP | 10191459 A | 7/1998 |
| JP | 10200536 A | 7/1998 |
| JP | 10214233 | 8/1998 |
| JP | 10240826 | 11/1998 |
| JP | 10512428 | 11/1998 |
| JP | 11127468 | 5/1999 |
| JP | 11136669 A | 5/1999 |
| JP | 11161167 | 6/1999 |
| JP | 11243569 A | 9/1999 |
| JP | 11510668 T | 9/1999 |
| JP | 11313059 A | 11/1999 |
| JP | 11331070 A | 11/1999 |
| JP | 11331150 A | 11/1999 |
| JP | 11513853 | 11/1999 |
| JP | 11355460 A | 12/1999 |
| JP | 11355858 A | 12/1999 |
| JP | 2000078555 A | 3/2000 |
| JP | 2000115860 | 4/2000 |
| JP | 2000134193 | 5/2000 |
| JP | 2000137551 A | 5/2000 |
| JP | 2000165258 A | 6/2000 |
| JP | 2000196546 A | 7/2000 |
| JP | 2000196673 A | 7/2000 |
| JP | 2000244603 | 9/2000 |
| JP | 2000253459 A | 9/2000 |
| JP | 2000261374 A | 9/2000 |
| JP | 2000269959 | 9/2000 |
| JP | 2000511733 T | 9/2000 |
| JP | 000513519 | 10/2000 |
| JP | 2000287192 | 10/2000 |
| JP | 2000295541 A | 10/2000 |
| JP | 2000324155 A | 11/2000 |
| JP | 2001007800 | 1/2001 |
| JP | 2001016253 A | 1/2001 |
| JP | 2001500327 T | 1/2001 |
| JP | 200136941 | 2/2001 |
| JP | 2001036466 A | 2/2001 |
| JP | 2001045100 A | 2/2001 |
| JP | 2001053675 A | 2/2001 |
| JP | 2001077859 A | 3/2001 |
| JP | 2001119340 A | 4/2001 |
| JP | 2001134193 | 5/2001 |
| JP | 2001136507 A | 5/2001 |
| JP | 2001177513 A | 6/2001 |
| JP | 2001177523 A | 6/2001 |
| JP | 2001177564 A | 6/2001 |
| JP | 2001512842 | 8/2001 |
| JP | 2001513587 | 9/2001 |
| JP | 2001333032 A | 11/2001 |
| JP | 2001522164 T | 11/2001 |
| JP | 2002026835 | 1/2002 |
| JP | 2002027417 | 1/2002 |
| JP | 2002064785 A | 2/2002 |
| JP | 2002505458 T | 2/2002 |
| JP | 2002506296 | 2/2002 |
| JP | 2002084470 A | 3/2002 |
| JP | 2002152194 | 5/2002 |
| JP | 2002514024 T | 5/2002 |
| JP | 2002175505 | 6/2002 |
| JP | 2002521879 T | 7/2002 |
| JP | 2002216040 | 8/2002 |
| JP | 2002217894 | 8/2002 |
| JP | 2002232418 A | 8/2002 |
| JP | 2002232962 | 8/2002 |
| JP | 2002300152 | 10/2002 |
| JP | 2002319936 A | 10/2002 |
| JP | 2002541685 | 12/2002 |
| JP | 2003503896 T | 1/2003 |
| JP | 200352029 | 2/2003 |
| JP | 2003099327 A | 4/2003 |
| JP | 2003115832 | 4/2003 |
| JP | 2003124927 | 4/2003 |
| JP | 2003521843 T | 7/2003 |
| JP | 2003259284 A | 9/2003 |
| JP | 2003297015 A | 10/2003 |
| JP | 2003529963 | 10/2003 |
| JP | 2003339000 A | 11/2003 |
| JP | 2004048718 A | 2/2004 |
| JP | 200480663 | 3/2004 |
| JP | 2004532554 | 10/2004 |
| JP | 2004533174 T | 10/2004 |
| JP | 2004343764 | 12/2004 |
| JP | 2005509367 T | 4/2005 |
| JP | 2005512471 T | 4/2005 |
| KR | 20000062153 | 10/2000 |
| KR | 200130725 | 4/2001 |
| KR | 20010030696 | 4/2001 |
| RU | 2073913 | 2/1997 |
| RU | 2077113 C1 | 4/1997 |
| RU | 2091983 C1 | 9/1997 |
| RU | 2115249 C1 | 7/1998 |
| RU | 2147792 C1 | 4/2000 |
| RU | 2187205 C2 | 8/2002 |
| TW | 353841 | 3/1999 |
| TW | 373372 | 11/1999 |
| TW | 388158 | 4/2000 |
| TW | 420910 B | 2/2001 |
| TW | 448658 | 8/2001 |
| TW | 502190 | 9/2002 |
| TW | 508958 B | 11/2002 |
| WO | WO8607224 A1 | 12/1986 |
| WO | WO9611538 A2 | 4/1996 |
| WO | WO9715161 A1 | 4/1997 |
| WO | WO9716890 A2 | 5/1997 |
| WO | WO9717790 A1 | 5/1997 |
| WO | WO9748212 A1 | 12/1997 |

| | | |
|---|---|---|
| WO | WO97047094 | 12/1997 |
| WO | WO9810604 A1 | 3/1998 |
| WO | WO9825422 A1 | 6/1998 |
| WO | WO9857509 A2 | 12/1998 |
| WO | WO9922478 A1 | 5/1999 |
| WO | WO99022466 A1 | 5/1999 |
| WO | WO9930234 A1 | 6/1999 |
| WO | WO9944114 A1 | 9/1999 |
| WO | WO9949595 A1 | 9/1999 |
| WO | WO9959355 A2 | 11/1999 |
| WO | WO9962231 A1 | 12/1999 |
| WO | WO9966657 A1 | 12/1999 |
| WO | WO0002406 A2 | 1/2000 |
| WO | WO0004718 A1 | 1/2000 |
| WO | WO0008883 A1 | 2/2000 |
| WO | WO0013356 A1 | 3/2000 |
| WO | WO0033535 A1 | 6/2000 |
| WO | WO0036804 A1 | 6/2000 |
| WO | WO0051308 A2 | 8/2000 |
| WO | WO2000048358 | 8/2000 |
| WO | WO0052880 A2 | 9/2000 |
| WO | WO0056018 A1 | 9/2000 |
| WO | WO0057601 A1 | 9/2000 |
| WO | WO0062476 | 10/2000 |
| WO | WO0062547 A1 | 10/2000 |
| WO | WO000072609 A1 | 11/2000 |
| WO | WO00074311 | 12/2000 |
| WO | WO0074425 A1 | 12/2000 |
| WO | WO0076125 A1 | 12/2000 |
| WO | WO0078008 A1 | 12/2000 |
| WO | WO0079734 A1 | 12/2000 |
| WO | WO0101630 A1 | 1/2001 |
| WO | WO0110146 A1 | 2/2001 |
| WO | WO2001013358 | 2/2001 |
| WO | WO0117163 | 3/2001 |
| WO | WO0119027 A2 | 3/2001 |
| WO | WO01020805 | 3/2001 |
| WO | WO0145443 | 6/2001 |
| WO | WO01050783 | 7/2001 |
| WO | WO01056232 A2 | 8/2001 |
| WO | WO2002008449 | 1/2002 |
| WO | WO0247407 A2 | 6/2002 |
| WO | WO2002047356 A2 | 6/2002 |
| WO | WO02054663 A2 | 7/2002 |
| WO | WO02061572 A1 | 8/2002 |
| WO | WO02080449 A1 | 10/2002 |
| WO | WO02080454 A2 | 10/2002 |
| WO | WO02096150 | 11/2002 |
| WO | WO03001772 | 3/2003 |
| WO | WO03032573 A2 | 4/2003 |
| WO | WO03051072 A1 | 6/2003 |
| WO | WO03063418 A1 | 7/2003 |
| WO | WO2004025895 A1 | 3/2004 |
| WO | WO2005008393 | 1/2005 |

OTHER PUBLICATIONS

"Functional Model of a Conditional Access System", *EBU Review—Technical European Broadcasting Union*, Bussels, BE, No. 266; Dec. 21, 1995; pp. 64-77; XP000559450.

Al-Tawil., "A New Authentication Protocol for Roaming Users in GSM", Proceedings for IEEE International Symposium on Computers and Communication, Jul. 6, 1999, pp. 93-99.

"Functional Model of a Conditional Access System", EBU Review, European Broadcasting Union, Brussels, BE, No. 269, Dec. 21, 1995, pp. 64-77.

International Search Report, PCTUS04/021530, International Search Authority—European Patent Office—Jan. 24, 2005.

Written Opinion; PCT/US04/021530, International Search Authority—European Patent Office—Jan. 24, 2005.

International Preliminary Report on Patentabiuty, PCT/US04/021530, IPEA/US, Feb. 21, 2006.

Asaka et al., "Dynamic Multicast Routing Using Predetermined Path Search". Technical Report of IEICE (The Institute of Electronics, Information and Communication Engineers), SSE95-56 IN99-37 CS99-78, Sep. 27, 1999.

Tadaumi, "IP Technology as Communication infra," The Institute of Electronics information and Communication Engineers. col. 83, No. 4, Apr. 2000, pp. 286-294.

"TIA/EIA/IS-95-B Mobile Station-Base Station Compatibility Standard for Dual-Mode Wideband Spread Spectrum Cellular System." (IS-95 Standard).

3G TS 25.213 V4.1.0 (Jun. 2001) 3rd Generation Partnership Project; Technical Specification Group Radio Access Network; Spreading and Modulation (FDD)(Release 4).

3GPP TS 25.211 V4.2.0 (Sep. 2001) 3rd Generation Partnership Project; Technical Specification Group Radio Access Network; Physical Channels and Mapping of Transport Channels Onto Physical Channels (FDD)(Release 4).

3GPP TS 25.212 V4.2.0 (Sep. 2001) 3rd Generation Partnership Project; Technical Specification Group Radio Access Network; Multiplexing and Channel Coding (FDD)(Release 4).

3GPP TS 25.214 V4.2.0 (Sep. 2001) 3rd Generation Partnership Project; Technical Specification Group Radio Access Network; Physical Layer Procedures (FDD)(Release 4).

3GPP2 C.S0002-0 Version 1.0 (Jul. 1999) 3rd Generation Partnership Project 2 "3GPP2" Physical Layer Standard for cdma2000 Spread Spectrum Systems.

B.G. March Ent et al. "Intelligent Control of Mobile Multimedia Systems" Vehicular Technology Conference 1998. VTC 98, 48th IEEE Ottawa, Canada, May 18-21 1998; New York, USA, May 18, 1998, pp. 2047-2051.

Baccelli, F et al: "Self Organizing Hierarchical Multicast Trees And Their Optimization," Infocom 1999. IEEE, 1081-1089 (Mar. 21, 1999).

Berkovits, S. "How to Broadcast a Secret" Advances in Cryptology, Eurocrypt, International Conference on the Theory and Application of Cryptographic Techniques, Springer-Verlag, Delaware, Apr. 11, 1991, pp. 535-541.

Bormann, C., et al. "Robust Header Compression (ROHC)" Internet Draft, Dec. 2000, pp. 1-122, XP002901751 (pp. 4-5).

Bormann, et al., "Robust Header Compression (ROHC)," Internet Engineering Task Force IETF Draft, 1-145, Feb. 26, 2001.

Brown: "The Electronic Post It Note Model for Mobile Computing Applications," Computing Lab, The University, Canterbury, Kent, The Institution of Electrical Engineers, IEEE, Savoy Place, London, WC2R OBL, UK.

Estrin, et al., "The Protocol Independent Multicast-Sparse Mode (PIM-SM)," RFC 2362, Jun. 1998.

ETSI TR 125 925 V3.3.0: "Universal Mobile Telecommunications System (UMTS); Radio Interface for Broadcast/Multicast Services (3GPP TR25.925 version 3.3.0 Release 1999)," XP002230388, p. 1-35, (Dec. 2000).

ETSI:"Universal Mobile Telecommunications Systems (UMTS); Multimedia Broadcast/Multicast Service (MBMS); Stage 1, 3GPP TS 22.146 version 5.2.0 Release 5", ETSI TS 22.146 v5.2.0, pp. 1-15, Mar. 2002.

Farinacci, D., et al., "Generic Routing Encapsulation (GRE)," Network Working Group Request for Comments 2784, Mar. 1-8, 2000. URL:http://www.globecom.net/ieft/rfc/rfc2784.html (retrieved on Feb. 14, 2003).

Foldoc, "Spread-spectrum communications", definition, dated Aug. 8, 2001, from http://foldoc.org/index.cgi?query=spread+spectrum.

Gong, L et al: "Trade-Offs in Routing Private Multicast Traffic," Global Telecommunications Conference, 1995. IEEE, 2124-2128 (Nov. 13, 1995).

Greg Rose et al., "The Secure Real Time Transport Protocol," Internet Draft, Feb. 2001, pp. 1-26.

Handley, M et al., "SDP: Session Description Protocol" Network Working Group, Request for Comments: 2327, Category: Standards Track. ISI/LBNL, Apr. 1998, pp. 1-42.

IEEE. "IEEE STD. 802.11, Part 11; Wireless LAN Medium Access Control (MAC) and Physical Layer (PHY) Specifications" 1997, pp. 60-70.

Jalali, A., et al. "Data Throughput of CDMA-HDR a High Efficiency-High Data Rate Personal Communication Wireless System," 2000 IEEE, pp. 1854-1858.

Jou, Y. "Developments in Third Generation (3G) CDMA Technology," 2000 IEEE, pp. 460-464.

Kalliokulju J.: "User Plane Architecture of 3rd Generation Mobile Telecommunication Network," IEEE International Conference on Networks, ICON, Proceedings on Networks (ICON'99), Sep. 28, 1999-Oct. 1, 1999, pp. 270-278, XP010354980.

Keeler, Robert E., "Interoperability Considerations for Digital HDTV," IEEE Transactions on Broadcasting, vol. 37, No. 4, Dec. 1991, pp. 128-130.

Lin, et al: "A Multicast Routing Protocol for Multihop Wireless Networks," Dept. of Computer Science and Information Engineering, Chung Cheng University, Taiwan, Global Telecommunications Conference, XP010373304.

Linuxguruz,: "Free On-Line Dictionary of Computing", § Internet Protocol, Dec. 2000.

Lou et al., "Progressive Video Streaming Over 2G and 3G Wireless Systems," Proceedings of the 11th IEEE International Symposium on Personal Indoor and Mobile Radio Communications, vol. 2, Sep. 18-21, 2000, London, pp. 1550-1554.

Macq. Benoit M et al. "Cryptology for Digital TV Broadcasting", 1995 IEEE.

Marchent, B.G., et al. "Intelligent Control of Mobile Multimedia Systems" Vehicular Technology Conference 1998. VTC 98, 48th IEEE Ottawa, Canada, May 18-21, 1998; New York, USA, May 18, 1998, pp. 2047-2051.

Menezes et al.: "Key Layering and Cryptoperiods," Passage, Handbook of Applied Cryptography, CRC Press Series on Discrete Mathematics and its Applications, Boca Raton, FL, CRC Press, US, 1997, pp. 551-553, 557-581.

Menezes, a et al.: "Handbook of Applied Cryptography" 1997, CRC Press LIC, USA XP002248262 pp. 497-500, 551-552.

Menezes, a et al.: "Handbook of Applied Cryptography," Chapter 13, pp. 543-590, CRC Press (1996).

Miyazaki: "A Stream-data Multicast Protocol Using IP Unicast Address" Technical Report of IEICE, 1N2001-9, May 11, 2001.

Mooij, W.: "Advances in Conditional Access Technology", IEEE, pp. 461-464 (Sep. 1997).

Moy, "Multicast Extensions to OSPF," RFC 1584, Mar. 1994.

Paul K et al: "A Stability-Based Distributed Routing Mechanism to Support Unicast and Multicast Routing in Ad Hoc Wireless Network" Computer Communications, Elsevier Science Publishers BV, Amsterdam, NI, vol. 24, No. 18, Dec. 1, 2001, pp. 1828-1845, XP0043.

Schneier, B.: "Applied Cryptography, Conference Key Distribution and Secret Broadcasting" Second Edition, pp. 520, 523-524, John Wiley & Sons, Inc. XP002248263 (1996).

Schneier, B.: "Applied Cryptography," Second Edition, pp. 170, 171, 173, John Wiley & Sons, Inc. (1996).

Schneier, B.: "Applied Cryptography," Second Edition, pp. 182-184, John Wiley & Sons, Inc. (1996).

Shannon, C.E., "A Mathematical Theory of Communication," the Bell System Technical Journal, vol. 27, pp. 379-423, 623-656, Jul., Oct. 1948.

Simpson, W., "PPP in Hdlc-Like Framing," Network Working Group, Request for Comments: 1662 (RFC 1662), Jul. 1994, pp. 1-17.

Stallings, W.: "Cryptography and network security" 1995, Prentice-Hall, Inc., XP002248261 pp. 402-406, 413-417, 421-424.

Takahashi: "Prospect of Push type Information Providing Service/Technology," Information Processing, vol. 39, No. 11, Nov. 15, 1998, p. 1124 -1131.

Tanenbaum, Andrew S.: Computer Networks, Third Edition; Pub. 1996; pp. 8, and 179-190.

Tanenbaum, Andrew S.: Computer Networks; Second Edition; Pub 1993 XP2530414.

TIA/EIA/IS-856 Interim Standard cdma2000 High Rate Packet Data Air Interface Specification (Nov. 2000).

Tineia/Is-95-A (Revision of TIA/EIA/IS-95) Mobile Station-Base Station Compatibility Standard for Dual-Mode Wideband Spread Spectrum Cellular System (Sep. 1995).

Toh C-K et al: "Abam: On-Demand Associativity-Based Multicast Routing for Ad Hoc Mobile Networks," Vehicular Technology Conference, 2000. IEEE, 987-993 (2000).

Waitzman, et al., "The Distance Vector Multicast Routing Protocol (DVMRP)," RFC 1075, Nov. 1, 1998.

Yamaguchi, S., "Realization of Multimedia Communications", Unix Magazine, ASCII Corporation, Jun. 1, 1996, vol. 11, No. 6, pp. 45-53.

Yang et al: "An Efficient Multicast Delivery Scheme to Support Mobile IP," Database and Expert Systems Applications, 1999. IEEE, 638-88 (Sep. 1, 1999).

You Xiaohu, "D&R Progress on China's 3g Mobile Communications", Telecom Science, vol. 2, 2001, pp. 11-17.

3GPP TS 25.214 v4.1.0(Jun. 2001) Universal Mobile Telecommunications System (UMTS); Physical layer procedures (FDD), Release 4, ETSI TS 125 214 V4.1.0, Jun 2001.

Alfred J. Menezes, Paul C. van Oorschot and Scott A. Vanstone. Handbook of Applied Cryptography, CRC Press. (Oct. 1996): p. 364 (in particular, refer to section 9.6.3), http://www.cacr.math.uwaterloo.ca/hac/about/chap9.pdf.

Baugher et al: "The Secure Real Time Transport Protocol" Internet Engineering Task Force, AVT Working Froup, Internet -Draft, Jul. 2003, XP002320685.

Bormann, C., et al. "Robust Header Compression (ROHC)" Internet Draft, pp. 1-153, Internet Engineering Task Force (Feb. 7, 2001).

Brown, D., "Techniques for Privacy and Authentication in Personal Communication Systems," IEEE Personal Communications, vol. 2, No. 4, pp. 6-10, Aug. 1995, doi: 10.1109/98.403452.

"Feature Story I: Evolution of Cellular Phones," Ascii, Dec. 1, 2000, vol. 24, No. 12, p. 204.

Haverinen, et al., "EAP SIM Authentication" draft-haver inen-pppext-eap-sim-11 .txt, [online] <URL:httpl/wwvv.watersprings.orglpub/id/draft-haverinen-pppext-eap-sim-11 .txt> Jun. 2003, pp. 1-64.

Haverinen H: "EAP SIM Authentication", 3GPP Draft; S3-010663_DRAFTHAVERINEN-PPPEXT-EAP-SIM-0 2, 3RD Generation Partnership-Project (3GPP), Mobile Competence Centre; 650, Route Des Lucioles ; F-06921 Sophia-Antipolis Cedex ; France, vol. SA WG3, No. Sophia; 20011128, Nov. 28, 2001, XP050271835, [retrieved on 2001-11-28].

JNSA, "Trend of the Latest Security Protocol IPsecH-with Demonstration Experiment Report for Interconnection," Network Magazine, vol. 6, No. 6, Japan, Jun. 2001, vol. 6, pp. 86-93.

Meier J D et al: "Building Secure ASP.Net Applications: Authentication, Authorization, and Secure Communication: Cryptography and Certificates" Microsoft Patterns & Practices, Nov. 2002, pp. 1-5, XP002321827.

Okamoto, "Encryption Technology for Realizing a Bright Information Society 5: Management of Encryption Key Distribution", Bit, Japan, Kyoritsu Shuppan Co., Ltd., Nov. 1, 1991, vol. 23, No. 12, pp. 51 -59.

Pannetrat, et al., "Authenticating real time packet streams and multicasts", 2002 IEEE. Computers and Communications, 2002. Proceedings. ISCC 2002. Seventh International Symposium on, pp. 490-495.

Pelletier, et al., "Robust Header Compression (ROHC): A Profile for TCP/IP (ROHC-TCP)", Internet Draft, Feb. 21, 2005, pp. 1-2.

Stallings, W.: "Cryptography and network security: Principles and Practice" Second Edition, 1999, Prentice Hall, New Jersey, pp. 400-413.

TIA/EIA/IS-95-B Mobile Station-Base Station Compatibility Standard for Dual-Mode Wideband Spread Spectrum Cellular System (IS-95 Standard), Feb. 3, 1999.

\* cited by examiner

SECURE REGISTRATION FOR A MULTICAST-BROADCAST-MULTIMEDIA SYSTEM (MBMS)

BACKGROUND

1. Field of the Invention

The present invention relates generally to telecommunications, and more specifically, to security in communication systems.

2. Background

In a wireless communication system which carries non-voice traffic, such as video, data, multimedia, or other types of traffic in addition to voice traffic, a typical cellular base station may broadcast a multimedia traffic service if the number of users demanding the service exceeds a predetermined threshold number within the coverage area of the base station. The multimedia traffic service may be a video stream of an event such as a sporting event or a highlighted portion of a sporting event, for example. If there are not enough users demanding the service in the coverage area, the base station may transmit the service only to the specific users who have demanded the service through dedicated channels instead of broadcasting the service to all users in the coverage area.

Sometimes a rogue or illegitimate user may attempt to force the base station to broadcast the service to all users in the coverage area by registering multiple times in an idle mode, for example, by assuming a number of different identities. If one or more rogue users use mobile telephones in the idle mode to register multiple times in a coverage area to receive the contents of an event, the base station may count the number of registrations as legitimate user registrations for the event and broadcast the event to all users in the coverage area.

Therefore, there is a need in the art for a network operator or content provider to have reliable means to verify that only legitimate registrations for a multimedia event be counted in a coverage area and not be forced to broadcast the event to all users in the coverage area due to fake registrations.

SUMMARY

Embodiments disclosed herein address the above stated needs by a method and an apparatus of obtaining secure registration in a multicast-broadcast-multimedia system (MBMS) using a temporary registration key (RGK).

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

A mobile station, also called user equipment (UE), may communicate with one or more base stations. A mobile station transmits and receives data packets through one or more base stations to a base station controller. Base stations and base station controllers are parts of a network called an access network. An access network transports data packets between multiple mobile stations. The access network may be further connected to additional networks outside the access network, such as a corporate intranet or the Internet, and may transport data packets between each mobile station and such outside networks. A mobile station that has established an active traffic channel connection with one or more base stations is called an active mobile station, and is said to be in a traffic state. A mobile station that is in the process of establishing an active traffic channel connection with one or more base stations is said to be in a connection setup state. A mobile station that is powered on and capable of receiving signals from a base station but is not in a traffic state or in a connection setup state is said to be in an idle state.

A communication link through which a mobile station sends signals to a base station is called a reverse link. A communication link through which a base station sends signals to a mobile station is called a forward link. A mobile station or user equipment (UE) may be a mobile telephone which includes a mobile telephone handset, also called mobile equipment (ME), and a memory module, such as a physically secure integrated circuit card or smart card called UICC, which may be removable or permanently attached to the ME. In a Global System for Mobile communication (GSM) telephone, the UICC is typically a subscriber identity module (SIM). In a code division multiple access (CDMA) telephone, the UICC is typically a removable user identity module (RUIM).

Figure 1:
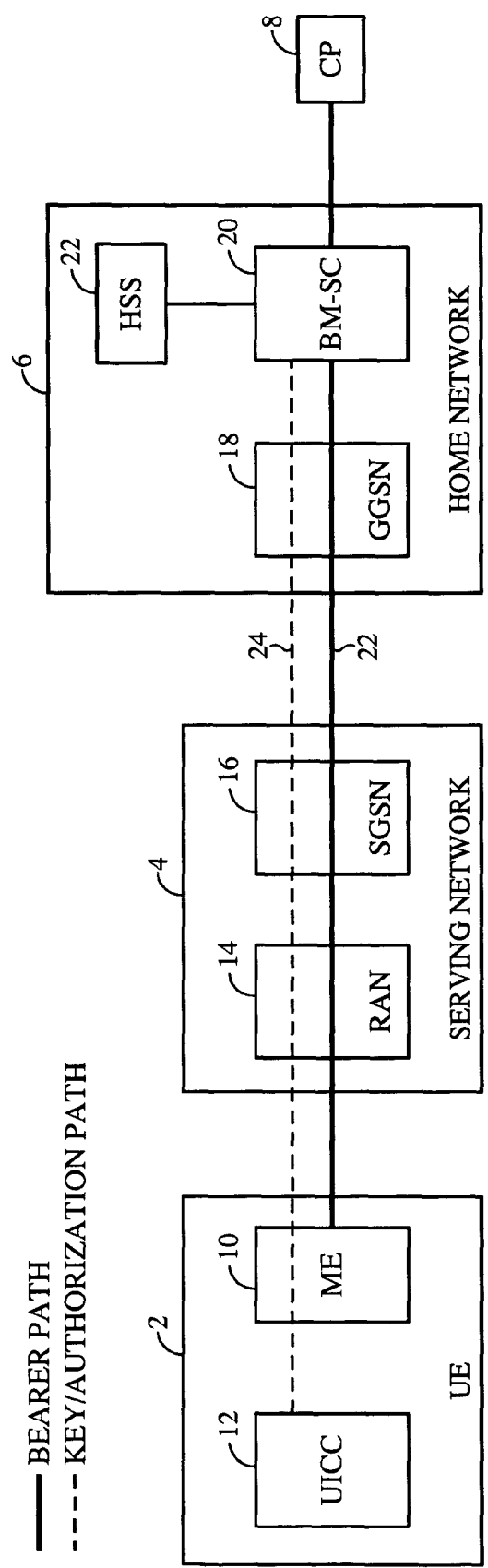
FIG. 1 is an exemplary block diagram illustrating a multicast-broadcast-multimedia system (MBMS) communication link.

FIG. 1 is an exemplary block diagram illustrating a communication link between user equipment (UE) 2, a serving network 4, a home network 6 and a content provider (CP) 8 in a multicast-broadcast-multimedia system (MBMS). The user equipment 2 may be a mobile station which includes mobile equipment (ME) 10 and a memory module or UICC 12. The UICC 12 may be either a removable memory module attached to the mobile equipment 10 or a permanent part of the mobile equipment 10. The physical implementation of the UICC 12 in the user equipment 2 is not critical to the present invention.

The serving network 4 may either be owned by the wireless carrier which provides subscription service to the user equipment 2, or be a visited network owned by another carrier which provides service to the user equipment 2 while the user equipment 2 is roaming. The serving network 4 typically includes a radio access network (RAN) 14 and a serving general packet radio service (GPRS) support node (SGSN) 16. The radio access network 14, also known as a base station (BS), a base transceiver station (BTS), or an access point (AP), transmits radio signals to and receives radio signals from the user equipment 2. The SGSN 16 is a core network node which may be part of a public land mobile network (PLMN), for example.

The home network 6 is the network owned by the wireless carrier which provides subscription service to the user equipment 2, and may or may not be owned by the same carrier as that of the serving network 4 depending upon whether the user equipment 2 is roaming outside the service area of the carrier. The home network 6 typically includes a gateway GPRS support node (GGSN) 18, a broadcast-multicast-service center (BM-SC) 20 and a home subscriber server (HSS) 22. The solid line 22 in FIG. 1 represents a bearer path on which information-bearing signals are carried from the content provider 8 through the home network 6 and the serving network 4 to the mobile equipment 10. The dashed line 24 in FIG. 1 represents a key/authorization path on which encryption and decryption keys are passed between the UICC 12, the serving network 4

The content provider 8 may be a third-party content source that is owned by neither the home network carrier nor the serving network carrier. The home subscriber server 22 in the home network 6 may include a database for holding mobile telephone subscription and collecting billing data for multicast services. In the embodiment shown in FIG. 1, the home network 6 also includes the broadcast-multicast-service center (BM-SC) 20 which schedules multicasting of the multimedia event and performs at least some security functions for the MBMS. The serving network 4 is the network that transmits the content to a single user through a dedicated channel, multicasts the content to a plurality of users through dedicated channels if the number of users demanding the service does not justify broadcasting the service to all users in the coverage area, or broadcasts the content to all users in the coverage area if the number of users demanding the service exceeds a predetermined threshold.

In an embodiment, the content of the multimedia event is encrypted and decrypted in the multicast-broadcast-multimedia system through several levels of encryption and decryption to provide at least some level of assurance that unauthorized users will not be able to decrypt the data and watch the multimedia event. For example, a permanent, user-specific registration key (RK) may be provided to generate temporary key (TK) values and to authenticate the UICC in the user's mobile telephone. The TK is a single use, user-specific key used to encrypt broadcast access key (BAK) values. The TK is also used by the UICC to decrypt the BAK values. The BAK is a medium-term, shared key which is used for deriving multiple short-term keys (SK) and distributed to UICCs of subscribed users on a per-user basis. The SK is a frequently changing, shared key which is used to encrypt and decrypt the content. The SK may be generated using a random number (SK_RAND) which is sent in the clear with the encrypted content and the BAK. The UICC 12 regenerates the SK from the BAK and SK_RAND, and passes the SK to the mobile equipment 10. Examples of schemes for encryption and decryption of data contents in a multicast-broadcast-multimedia system are described in U.S. patent application Ser. No. 09/933,972, entitled "Method and Apparatus for Security in a Data Processing System," filed Aug. 20, 2001, incorporated herein by reference. Various other embodiments of using public keys or shared-secret keys for encryption and decryption may also be implemented within the scope of the invention. For example, in an alternate embodiment, secure delivery or provisioning of BAK to the UICC may be provided by using public key mechanisms such as RSA or ElGamal, which are known to persons skilled in the art.

Figure 2:
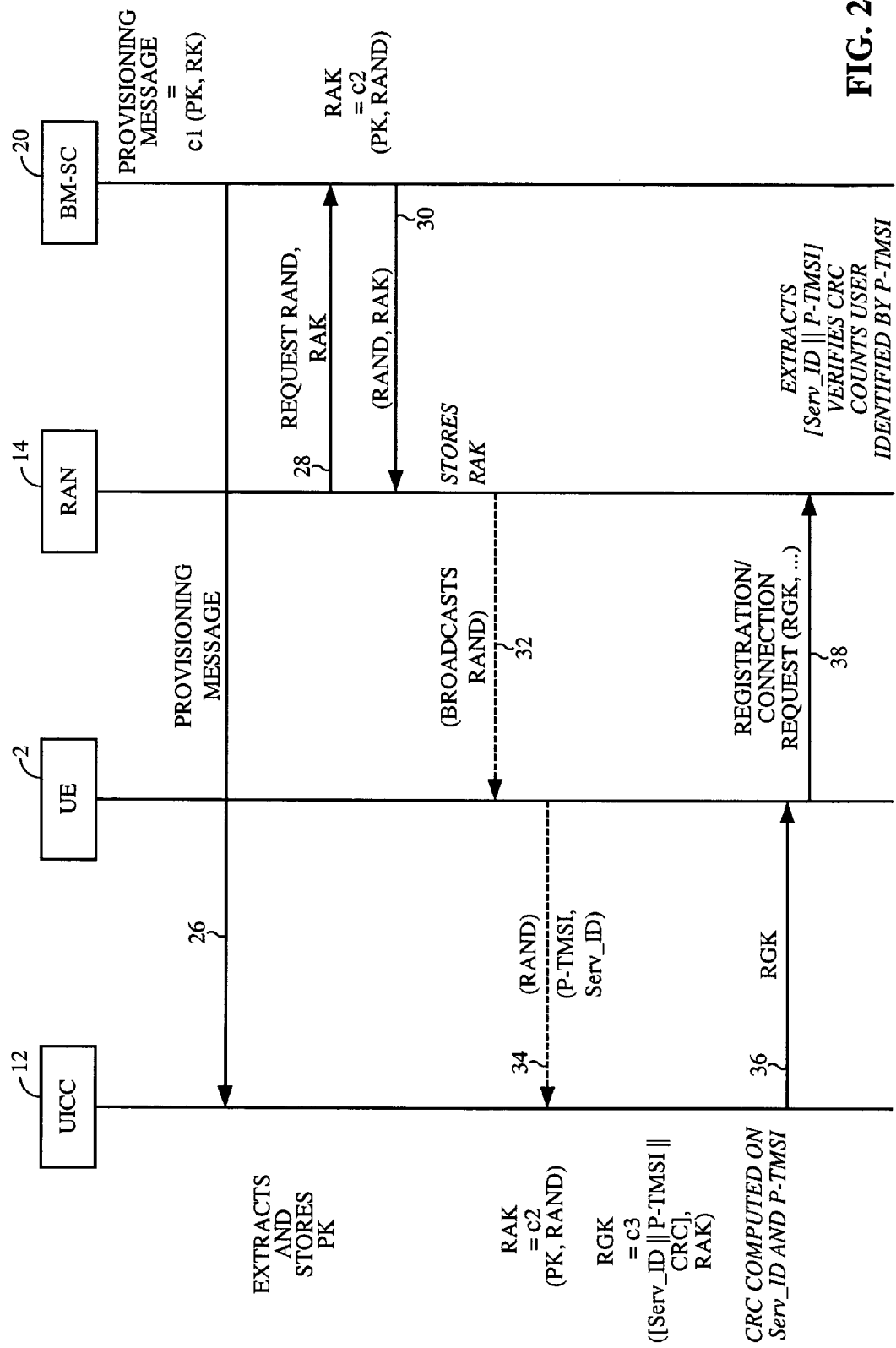
FIG. 2 is a diagram illustrating an embodiment of secure registration in the MBMS.

FIG. 2 illustrates an embodiment of secure registration in a multicast-broadcast-multimedia system. In this embodiment, the broadcast-multicast-service center (BM-SC) 20 transmits a provisioning message, which is a function of a public land mobile network (PLMN) key referred to as PK, and the permanent, user-specific registration key referred to as RK. The PK is a temporary, home PLMN specific key used to generate a radio access network (RAN) key referred to as RAK, and to authenticate the UICC 12. The provisioning message is transmitted from the BM-SC 20 to the UICC 12 along a path 26 as illustrated in FIG. 2. The provisioning message, which is a function with arguments PK and RK, may be represented as c1(PK, RK). Upon receiving the provisioning message, the UICC 12 extracts the PK from the provisioning message and stores the PK value. Other embodiments for implementing the secure delivery or provisioning of PK to the UICC may be provided within the scope of the invention by using public key mechanisms including but not limited to RSA and ElGamal.

The radio access network (RAN) 14 transmits a request for the RAK and a random number (RAND) along a path 28 to the BM-SC 20, which in response generates the RAK which is a function with arguments PK and RAND. The RAK, which may be represented as c2(PK, RAND), is transmitted by the BM-SC 20 to the RAN 14 along a path 30. The RAK is a temporary, RAN specific key used to generate temporary, user-specific registration key (RGK) values and to hide the PK from the RAN 14 which is visited by the UE 2. The RAK is also used to cipher the MBMS service identification number (Serv_ID) and a user identification number such as P-TMSI, IMSI, electronic serial number (ESN), MIN, or any permanent or temporary user identification number used in the system in which an embodiment of the present invention is implemented. In the embodiments shown in FIGS. 2 and 3, P-TMSI is used as an exemplary user identification number known to a person skilled in the art.

The RAN may store the RAK and broadcast the RAND to all users including UE 2 within the coverage area of the RAN along a path 32. The UE 2, upon receiving the RAND, sends the RAND as well as the P-TMSI and the Serv_ID to the UICC 12 along a path 34. The UICC 12 generates the RAK which is an exact copy of the RAK generated by the BM-SC 20. After receiving the Serv_ID and the P-TMSI, the UICC 12 concatenates the Serv_ID and the P-TMSI to obtain a concatenated result denoted as [Serv_ID||P-TMSI], and computes a cyclic redundancy code (CRC) based on the Serv_ID and P-TMSI. The CRC is appended to [Serv_ID||P-TMSI] to generate [Serv_ID||P-TMSI||CRC]. The UICC 12 then generates the RGK which is a function of the Serv_ID, P-TMSI, CRC and RAK represented as c3([Serv_ID||P-TMSI||CRC], RAK). The RGK is a temporary, user-specific key used to authenticate registration messages.

After the RGK is generated, the UICC 12 sends the RGK along a path 36 to the UE 2, which in turn transmits a registration/connection request including the RGK to the RAN 14 along a path 38. The RAN 14, upon receiving the registration/connection request, extracts the [Serv_ID||P-TMSI], verifies the CRC, and counts the user identified by the P-TMSI as a legitimate user who has sent a valid registration message to request the multimedia service. If the registration/connection message transmitted by the user is not verified by the RAN 14, then the RAN may regard the user as a rogue or illegitimate user and does not count the request as legitimate.

Figure 3:
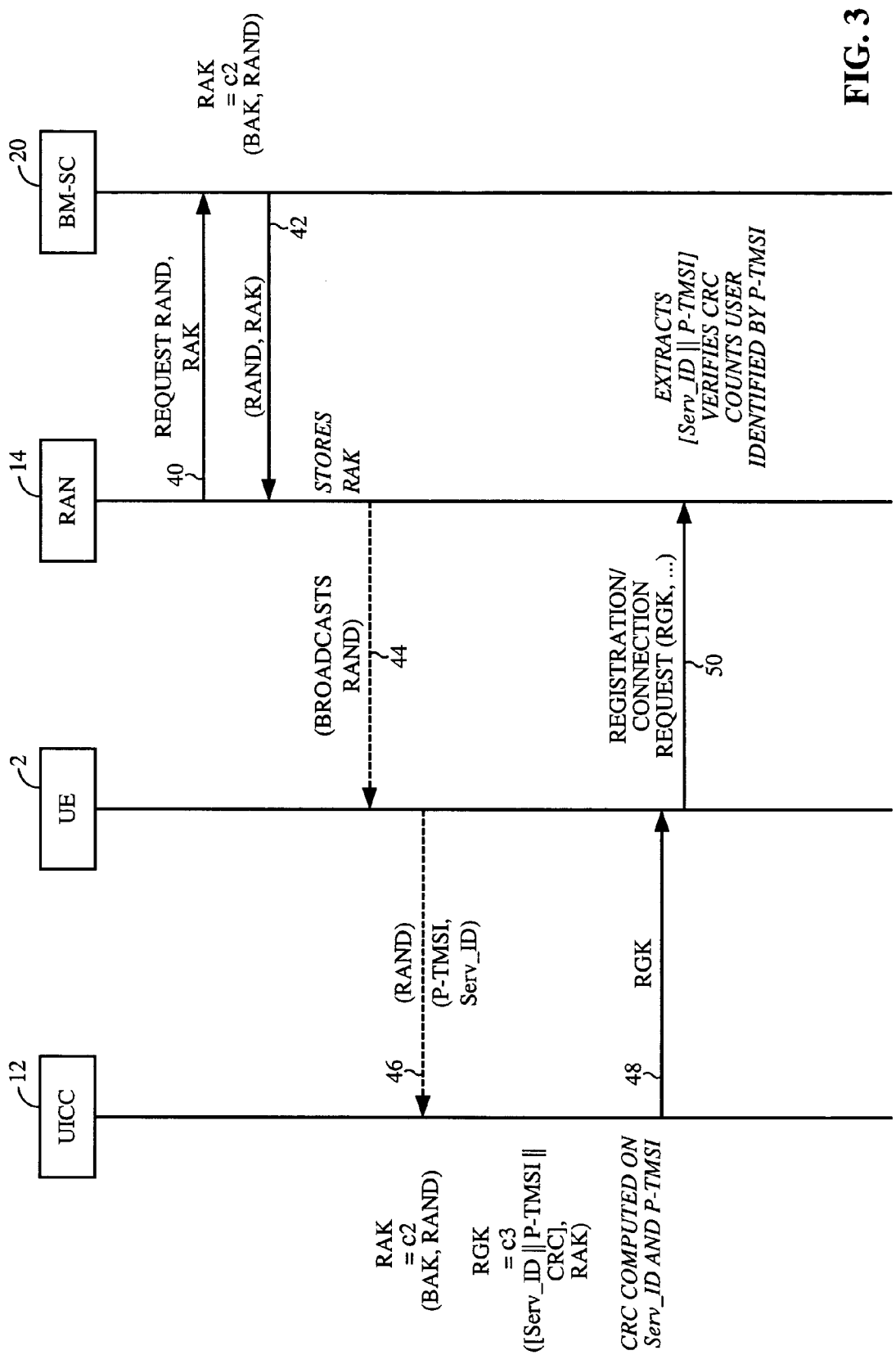
FIG. 3 is a diagram illustrating another embodiment of secure registration in the MBMS.

FIG. 3 illustrates another embodiment of secure registration in a multicast-broadcast-multimedia system. In this embodiment, no provisioning message is transmitted by the broadcast-multicast-service center (BM-SC) 20. Instead, the radio access network (RAN) 14 transmits a request for the RAK and a random number (RAND) along a path 40 to the BM-SC 20, which in response generates the RAK and the RAND. The RAK is a function with arguments BAK and RAND represented as c2(BAK, RAND). The BAK is the same broadcast access key used as part of the encryption scheme to encrypt the data contents described above. The RAND and RAK are transmitted by the BM-SC 20 to the RAN 14 along a path 42. The RAK is a temporary, RAN specific key used to generate temporary, user-specific registration key (RGK) values. The RAK is also used to cipher the MBMS service identification number (Serv_ID) and a user identification number referred to as P-TMSI.

The RAN may store the RAK and broadcast the RAND to all users including UE 2 within the coverage area of the RAN along a path 44. The UE 2, upon receiving the RAND, sends the RAND as well as the P-TMSI and the Serv_ID to the UICC 12 along a path 46. The UICC 12 generates the RAK which is an exact copy of the RAK generated by the BM-SC 20. After receiving the Serv_ID and the P-TMSI, the UICC 12 concatenates the Serv_ID and the P-TMSI to obtain a concatenated result denoted as [Serv_ID||P-TMSI], and computes a cyclic redundancy code (CRC) based on the Serv_ID and P-TMSI. The CRC is appended to [Serv_ID||P-TMSI] to generate [Serv_ID||P-TMSI||CRC]. The UICC 12 then generates the RGK which is a function of the Serv_ID, P-TMSI, CRC and RAK, represented as c3([Serv_ID||P-TMSI||CRC], RAK). The RGK is a temporary, user-specific key used to authenticate registration messages.

After the RGK is generated, the UICC 12 sends the RGK along a path 48 to the UE 2, which in turn transmits a registration/connection request including the RGK to the RAN 14 along a path 50. The RAN 14, upon receiving the registration/connection request, extracts the [Serv_ID||P-TMSI], verifies the CRC, and counts the user identified by the P-TMSI as a legitimate user who has sent a valid registration message to request the multimedia service. If the registration/connection message transmitted by the user is not verified by the RAN 14, then the RAN may regard the user as a rogue or illegitimate user and does not count the request as legitimate.

The RAN 14 may receive a plurality of registration/connection requests from a plurality of users within the coverage area and decide which requests are valid ones transmitted by legitimate users by verifying the CRC computed from the Serv_ID and P-TMSI of each user. The RAN may ignore those requests with RGKs which include unverifiable CRCs. In this manner, the RAN has a highly reliable means of determining how many registration requests for a certain multimedia event are valid, and would not be forced to broadcast the event if the number of legitimate users is not enough to justify broadcasting the event.

Various other features may also be added to the temporary registration message (RGK) within the scope of the present invention. For example, a time stamp for system time may be added to the RGK. The RAN 14 may use the P-TMSI extracted from the RGK to determine whether the user who is attempting to register is actually a subscriber, if the RAN has the P-TMSIs of all subscribed users in the coverage area. In a typical GSM system, the P-TMSI may be allocated at the logical link control (LLC) level in the GSM/GPRS, that is, in the core network (CN). In another embodiment, a public key may be used in forming the RGK to avoid replay attacks by rogue users. For example, if each UICC has a private key used for provisioning PK or BAK, the RGK may include a reference to the public key or certificate and a signature of the BAK-hash or PK-hash. Replay attacks by rogue users may be prevented or at least limited by using techniques such as sequence numbers or digital signatures based on public key cryptography.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, numerical ordinals such as "first," "second," "third," etc. simply denote different singles of a plurality and do not imply any order or sequence unless specifically defined by the claim language.

Furthermore, words such as "connect," "connected to" and "connection" used in describing a relationship between different elements do not imply that a direct physical connection must be made between these elements. For example, two elements may be connected to each other physically, electronically, logically, or in any other manner, through one or more additional elements, without departing from the scope of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), erasable programmable read only memory (EPROM), electrically erasable programmable read only memory (EEPROM), registers, a hard disk, a removable disk, a compact disc-read only memory (CD-ROM), or any other form of storage medium known in the art. An exemplary storage medium is coupled to the processor such that the processor can read information from, and write information to, the storage medium. Alternatively, the storage medium may be integral to the processor. The processor and the storage medium may reside in a single ASIC or as separate components in a base station, for example.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of obtaining secure registration by a memory module (UICC) in a multicast-broadcast-multimedia system (MBMS), the method comprising:
   receiving a random number;
   generating a radio access network key (RAK) as a function of the random number and a key selected from the group consisting of a public land mobile network key (PK) and a broadcast access key (BAK);
   generating temporary registration key (RGK) as a function of the RAK and a user identification number; and
   authenticating at least one registration message in the MBMS based on the RGK, wherein the RGK is a function of the RAK, a service identification number and the user identification number.

2. The method of claim 1, further comprising transmitting the RGK to a mobile telephone.

3. The method of claim 1, further comprising receiving a provisioning message from a broadcast-multicast service center.

4. The method of claim 3, wherein the provisioning message is a fraction of the PK and a permanent registration key (RK).

5. The method of claim 3, further comprising extracting the PK from the provisioning message.

6. The method of claim 1, wherein the RGK is a function of the RAK and a cyclic redundancy code (CRC) computed from the service identification number and the user identification number.

7. The method of claim 1, wherein the UICC comprises a subscriber identity module (SIM) in a Global System for Mobile communication (GSM).

8. The method of claim 1, wherein the UICC comprises a removable user identity module (RUIM) in a code division multiple access (CDMA) system.

9. The method of claim 1, wherein the PK is provisioned by using a public key.

10. The method of claim 1, wherein the BAK is provisioned by using a public key.

11. A method of obtaining secure registration by a mobile station in a multicast-broadcast-multimedia system (MBMS), the method comprising:
    receiving a random number from a radio access network;
    transmitting the random number to a memory module (UICC);
    receiving from the UICC a temporary registration key (RGK) based on the random number and a user identification number; and
    authenticating at least one registration message in the MBMS based on the RGK, wherein the RGK is a function of a radio access network key (RAK), a service identification number and a user identification number, and wherein the RAK is a function of the random number and a key selected from the group consisting of a public land mobile network key (PK) and a broadcast access key (BAK).

12. The method of claim 11 wherein the PK is extracted from a provisioning message received from a broadcast-multicast service center.

13. The method of claim 12, wherein the provisioning message is a function of the PK and a permanent registration key (RK).

14. The method of claim 11, wherein the RGK is a function of the RAK and a cyclic redundancy code (CRC) computed from the service identification number and the user identification number.

15. The method of claim 11, wherein the UICC comprises a subscriber identity module (SIM) in a Global System for Mobile communication (GSM) system.

16. The method of claim 11, wherein the UICC comprises a removable user identity module (RUIM) in a code division multiple access (CDMA) system.

17. The method of claim 11, wherein the PK is provisioned by using a public key.

18. The method of claim 11, wherein the BAR is provisioned by using a public key.

19. A memory module stored on a computer readable storage medium, comprising:
    receiving logic configured for receiving a random number;
    means for generating a radio access network key (RAK) as a function of the random number and a key selected from the group consisting of a public land mobile network key (PK) and a broadcast access key (BAK);
    means for generating a temporary registration key (RGK) as a function of the RAK and a user identification number; and
    means for authenticating at least one registration message in the MBMS based on the RGK, wherein the RGK is a function of the RGK, service identification number and the user identification number.

20. The memory module of claim 19, further comprising means for transmitting the RGK to a mobile telephone.

21. The memory module of claim 19, further comprising means for receiving a provisioning message from a broadcast-multicast service center.

22. The memory module of claim 21, wherein the provisioning message is a function of the PK and a permanent registration key (RK).

23. The memory module of claim 21, further comprising means for extracting the PK from the provisioning message.

24. The memory module of claim 19, wherein the RGK is a function of the RAK and a cyclic redundancy code (CRC) computed from the service identification number and the user identification number.

25. The memory module of claim 19, wherein the PK is provisioned by using a public key.

26. The memory module of claim 19, wherein the BAK is provisioned by using a public key.

27. A mobile station apparatus, comprising:
    receiving logic configured for receiving a random number from a radio access network;
    means for transmitting the random number to a memory module (UICC);
    means for receiving from the UICC a temporary registration key (RGK) based on the random number and a user identification number; and
    means for authenticating at least one registration message in the MBMS based on the RGK, wherein the RGK is a function of a radio access network key (RAK), a service identification number and a user identification number, and wherein the RAK is a function of the random number and a key selected from the group consisting of a public land mobile network key (PK) and a broadcast access key (BAK).

28. The apparatus of claim 27, wherein the PK is extracted from a provisioning message received from a broadcast-multicast service center.

29. The apparatus of claim 28, wherein the provisioning message is a function of the PK and a permanent registration key (RK).

30. The apparatus of claim 27 wherein the RGK is a function of the RAK and a cyclic redundancy code (CRC) computed from the service identification number and the user identification number.

31. The apparatus of claim 27, wherein the UICC comprises a subscriber identity module (SIM) in a Global System for Mobile communication (GSM) system.

32. The apparatus of claim 27, wherein the UICC comprises a removable user identity module (RUIM) in a code division multiple access (CDMA) system.

33. The apparatus of claim 27, wherein the PK is provisioned by using a public key.

34. The apparatus of claim 27, wherein the BAK is provisioned by using a public key.

35. A computer readable storage medium storing instructions for obtaining secure registration by a memory module (UICC) in a multicast-broadcast-multimedia system (MBMS), the method comprising:
    receiving a random number;
    generating a radio access network key (RAK) as a function of the random number and a key selected from the group consisting of a public land mobile network key (PK) and a broadcast access key (BAK);
    generating a temporary registration key (RGK) as a function of the RAK and a user identification number; and
    authenticating at least one registration message in the MBMS based on the RGK, wherein the RGK is a function of the RAK, a service identification number and a user identification number.

36. The computer readable storage device of claim 35, wherein the method further comprises transmitting the RGK to a mobile telephone.

37. The computer readable storage device of claim 35, wherein the method further comprises receiving a provisioning message from a broadcast-multicast service center.

38. The computer readable storage device of claim 37, wherein the provisioning message is a function of the PK and a permanent registration key (RK).

39. The computer readable storage device of claim 37, wherein the meted further comprises extracting the PK flora the provisioning message.

40. The computer readable storage device of claim 35, wherein the RGK is a function of the RAK and a cyclic redundancy code (CRC) computed from the service identification number and the user identification number.

41. The computer readable storage device of claim 35, wherein the UICC comprises a subscriber identity module (SIM) in a Global System for Mobile communication (GSM) system.

42. The computer readable storage device of claim 35, wherein the UICC comprises a removable user identity module (RUIM) in a code division multiple access (CDMA) system.

43. The computer readable storage device of claim 35, wherein the PK is provisioned by using a public key.

44. The computer readable storage device of claim 35, wherein the BAK is provisioned by using a public key.

45. A computer readable storage device storing instructions for obtaining secure registration by a mobile station in a multicast-broadcast-multimedia system (MBMS), the method comprising:
    receiving a random number from a radio access network;
    transmitting the random number to a memory module (UICC);
    receiving from the UICC a temporary registration key (RGK) based on the random number and a user identification number; and
    authenticating at least one registration message in the MBMS based on the RGK, wherein the RGK is a function of a radio access network key (RAK), a service identification number and a user identification number, and wherein the RAK is a function of the random number and a key selected from the group consisting of a public land mobile network key (PK) and a broadcast access key (BAK).

46. The computer readable storage device of claim 45, wherein the PK is extracted from a provisioning message received from a broadcast-multicast service center.

47. The computer readable storage device of claim 46, wherein the provisioning message is a function of the PK and a permanent registration key (RK).

48. The computer readable storage device of claim 45, wherein the RGK is a function of the RAK and a cyclic redundancy code (CRC) computed from the service identification number and the user identification number.

49. The computer readable storage device of claim 45, wherein the UICC comprises a subscriber identity module (SIM) in a Global System for Mobile communication (GSM) system.

50. The computer readable storage device of claim 45, wherein the UICC comprises a removable user identity module (RUIM) in a code division multiple access (CDMA) system.

51. The computer readable storage device of claim 45, wherein the PK is provisioned by using a public key.

52. The computer readable storage device of claim 45, wherein the BAK is provisioned by using a public key.

* * * * *